United States Patent
Takahashi

(10) Patent No.: US 10,057,068 B2
(45) Date of Patent: Aug. 21, 2018

(54) BIOMETRIC SIGNATURE SYSTEM, SIGNATURE VERIFICATION METHOD, REGISTRATION TERMINAL, SIGNATURE GENERATION TERMINAL, AND SIGNATURE VERIFICATION DEVICE

(71) Applicant: HITACHI, LTD., Tokyo (JP)

(72) Inventor: Kenta Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 259 days.

(21) Appl. No.: 14/892,413

(22) PCT Filed: May 28, 2013

(86) PCT No.: PCT/JP2013/064810
§ 371 (c)(1),
(2) Date: Nov. 19, 2015

(87) PCT Pub. No.: WO2014/192086
PCT Pub. Date: Dec. 4, 2014

(65) Prior Publication Data
US 2016/0094348 A1 Mar. 31, 2016

(51) Int. Cl.
*H04L 9/32* (2006.01)
*H04L 9/08* (2006.01)

(52) U.S. Cl.
CPC .......... *H04L 9/3247* (2013.01); *H04L 9/0866* (2013.01); *H04L 9/3218* (2013.01);
(Continued)

(58) Field of Classification Search
CPC ... H04L 9/3247; H04L 9/0866; H04L 9/3218; H04L 9/3231; H04L 9/3263;
(Continued)

(56) References Cited

U.S. PATENT DOCUMENTS 6,202,151 B1 * 3/2001 Musgrave .............. G06Q 20/04
713/170
2002/0026427 A1 * 2/2002 Kon ........................ G06F 21/31
705/67

(Continued)

FOREIGN PATENT DOCUMENTS

| EP | 2360615 A1 * | 8/2011 |
| JP | 2002-538504 A | 11/2002 |
| JP | 2010-510744 A | 4/2010 |

OTHER PUBLICATIONS

Y. Dodis, et al., "Fuzzy extractors: How to generate strong keys," In Eurocrypt 2004, vol. 3027 of LNCS, pp. 523 to 540, 2004.
Yuta Yoneyama, et al., "Fuzzy Signature Scheme for Biometric Digital Signature," symposium on cryptography and information security 2012 (SCIS2012), 2012.
B. Waters, "Efficient identity based encryption without random oracles," In Eurocrypt 2005, vol. 3494 of LNCS, pp. 114 to 127, 2005.

(Continued)

*Primary Examiner* — Hadi S Armouche
*Assistant Examiner* — Shu C Gao
(74) *Attorney, Agent, or Firm* — Volpe and Koenig, P.C.

(57) ABSTRACT

A biometric signature system generates a digital signature for electronic documents using biometric information as a secret key. Registration commitment information is generated by performing expansion conversion on a predetermined secret key and embedding the resulting secret key in feature data of biometric information of a user, and a set with a corresponding public key. A pair of one-time secret and public keys is generated for digital signature feature data of the biometric information of the user, and a digital signature for a message is generated using the one-time secret key. A digital signature commitment is generated and a set of the one-time public key and the digital signature is output as the biometric digital signature. The digital signature is verified using the one-time public key. A differential secret key is calculated and a correspondence of the differential secret key, the one-time public key and the public key is verified.

4 Claims, 5 Drawing Sheets

(52) U.S. Cl.
CPC .......... *H04L 9/3231* (2013.01); *H04L 9/3263* (2013.01); *H04L 2209/30* (2013.01); *H04L 2209/34* (2013.01)

(58) Field of Classification Search
CPC ....... H04L 9/0825; H04L 9/302; H04L 9/321; H04L 9/3249; H04L 63/0442; H04L 63/061; H04L 9/0841; H04L 2209/56; H04L 2209/80; H04L 2209/608; H04L 2209/805; H04L 2209/88; H04L 9/3228; H04L 2209/60; H04L 9/0863; H04L 63/12; H04L 63/0428; H04L 63/0823; H04L 9/3273; G07C 9/00158; G07C 9/00166; G07C 2209/1205; G06Q 20/40; G06Q 20/40145; G06Q 20/02; G06Q 20/04; G06Q 20/3823; G06Q 20/3829; G06Q 20/4014; G07F 7/1008; G06F 2221/2115; G06F 21/33; G06F 21/10; G06F 2221/2107; G11B 20/00086; H04N 7/1675; H04N 7/173; H04N 21/258; H04N 21/25875; H04N 21/4627; H04N 21/4786; H04N 21/4788; H04N 21/6125

See application file for complete search history.

(56) References Cited

U.S. PATENT DOCUMENTS

| | | |
|---|---|---|
| 2002/0029341 A1 | 3/2002 | Ari et al. |
| 2002/0069361 A1* | 6/2002 | Watanabe ............. H04L 9/3231 713/185 |
| 2003/0219121 A1* | 11/2003 | van Someren ..... G07C 9/00158 380/44 |
| 2004/0059924 A1* | 3/2004 | Soto ........................ G06F 21/32 713/186 |
| 2008/0155269 A1* | 6/2008 | Yoshikawa ........... H04L 9/3231 713/186 |
| 2010/0058063 A1 | 3/2010 | Theo et al. |
| 2012/0131350 A1* | 5/2012 | Atherton ................ G06F 21/32 713/186 |
| 2013/0174243 A1* | 7/2013 | Inatomi ................ H04L 9/3231 726/7 |

OTHER PUBLICATIONS

Yuta Yoneyama, "Lazy Signature: A non-registered Digital Signature Using Biometrics", IPSJ SIG Notes, Aug. 2012 [CD-ROM], Aug. 15, 2012 (Aug. 15, 2012), pp. 1 to 7.

* cited by examiner

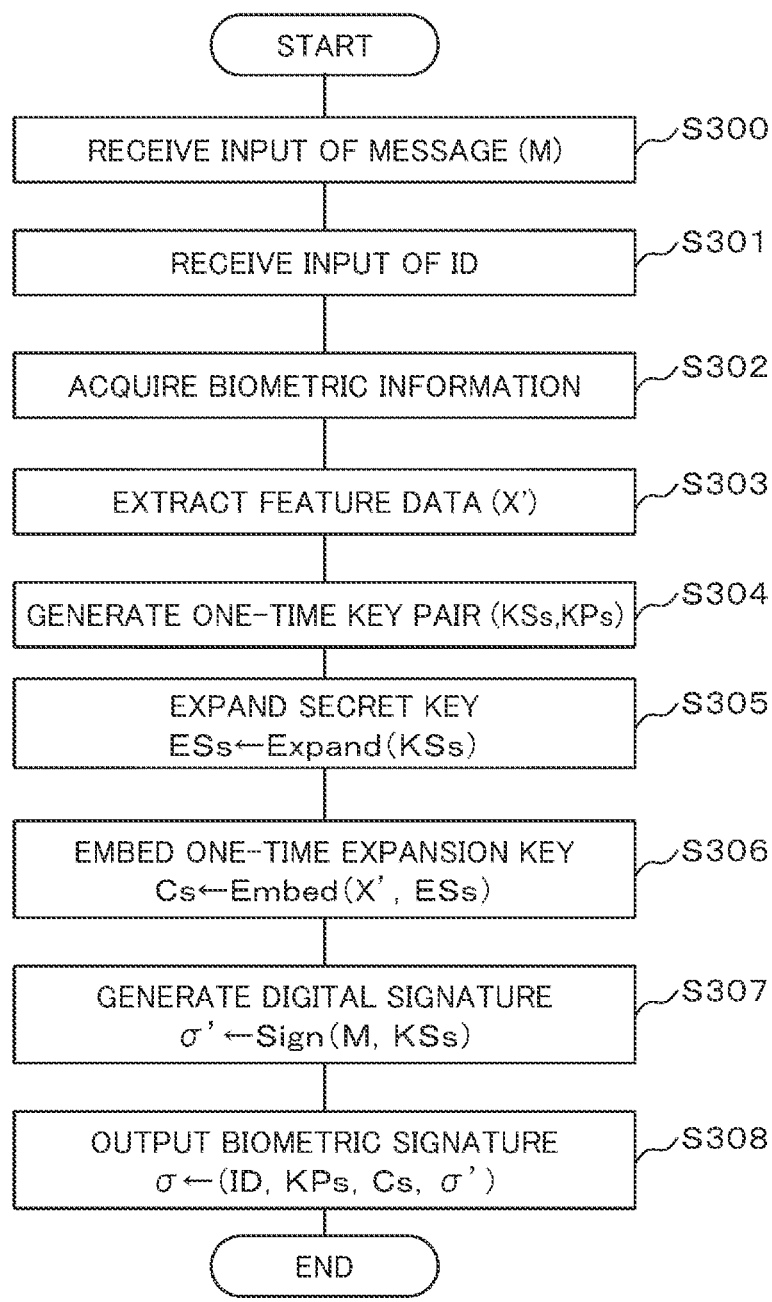
F I G. 4

BIOMETRIC SIGNATURE SYSTEM, SIGNATURE VERIFICATION METHOD, REGISTRATION TERMINAL, SIGNATURE GENERATION TERMINAL, AND SIGNATURE VERIFICATION DEVICE

TECHNICAL FIELD

The present invention relates to a biometric signature system, a signature verification method, a registration terminal, a signature generation terminal, and a signature verification device, and more particularly, to a biometric signature system, a signature verification method, a registration terminal, a signature generation terminal, and a signature verification device, which are capable of generating and verifying a digital signature using personal biometric information as a secret key.

BACKGROUND ART

A digital signature has been widely used for the purpose of prevention of forgery and falsification of an electronic document or personal authentication. In the past, as a digital signature, a pair of a secret key and a public key are generated in advance and held. Particularly, the secret key is commonly stored in an IC card or the like and managed by a signer so that the secret key can be used by only the signer and kept secret from other people. The signer can generate a digital signature for an arbitrary electronic document using the secret key, and a verifier can verify that a set of the digital signature and the electronic document is right (neither forged nor falsified) using a public key. As a digital signature algorithm, there are an RSA, a DSA, a Schnorr digital signature, and the like, and a public key infrastructure (PKI) is constructed using the algorithm.

Meanwhile, biometric authentication of performing personal authentication based on biometric information has an advantage in which it is not lost, not forgotten, and not stolen compared to authentication based on a card or a password, and can implement personal authentication having high convenience and high resistance to impersonation. In a common biometric authentication system, feature data (template) is extracted from user's biometric information and held. At the time of authentication, feature data is extracted from the biometric information of the user, and when the extracted feature data is determined to be identical to (sufficiently similar to) the template, the authentication succeeds. However, it is difficult to replace biometric information such as a fingerprint or a vein. For this reason, if a template leaks, it is difficult to recover lifetime security.

With respect to this problem, a technique (a biometric key generation technique) of generating a secret key from biometric information while protecting biometric information is disclosed in Non Patent Document 1. In this technique, at the time of registration, helper data $H=F(X,K)$ is generated such that a secret key K is embedded in biometric information X in an indivisible form. At the time of key recovery, biometric information X' is acquired again, and a secret key $K'=G(X', H)$ is recovered using the helper data H. If X' is sufficiently close to X, for example, an error correction code technique is used for an embedding function F and a recovery function G so that K'=K is held.

In the technique disclosed in Non Patent Document 1, since the helper data is necessarily needed at the timing of signing, a helper data repository and a device through which a signature generation terminal accesses the helper data are necessary. When the helper data is kept in the IC card or the like, the user needs to carry belongings for signing, and thus convenience is lowered. However, when the helper data is kept in a local terminal, a digital signature can be generated only from the terminal, and thus a use thereof is limited. Further, when the helper data is kept in a server, a digital signature can be generated only from a terminal connected to a network, and there is a problem in that it takes a time to generate a digital signature since communication with the server is performed for each digital signature.

Further, in a technique disclosed in Non Patent Document 2, a digital signature system using biometric information is proposed. However, security thereof has been discussed under the assumption that a biometric information distribution is a uniform distribution. However, in reality, the biometric information distribution is commonly a biased distribution rather than a uniform distribution. In this case, it is a problem to secure security.

CITATION LIST

Non Patent Document

Non Patent Document 1: Y. Dodis, et al., "Fuzzy extractors: How to generate strong keys," In Eurocrypt 2004, Vol. 3027 of LNCS, pp. 523 to 540, 2004

Non Patent Document 2: Yuta Yoneyama, et al., "Fuzzy Signature Scheme for Biometric Digital Signature," symposium on cryptography and information security 2012 (SCIS2012), 2012

Non Patent Document 3: B. Waters, "Efficient identity based encryption without random oracles," In EUROCRYPT 2005, Vol. 3494 of LNCS, pp. 114 to 127, 2005

SUMMARY OF THE INVENTION

Problems to be Solved by the Invention

It is an object of the present invention to provide a biometric signature system capable of guaranteeing security even when a biometric information distribution is biased.

Solutions to Problems

The above problem is solved by a biometric signature system, including: a registration terminal that generates a biometric certificate based on registration feature data of biometric information of a registration user, a signature generation terminal that generates a digital signature for a predetermined message based on digital signature feature data of biometric information of a digital signature generation user, and a signature verification device that verifies the digital signature based on the biometric certificate, wherein the registration terminal includes a sensor that acquires biometric information of a user, a feature data extracting unit that extracts the registration feature data from the biometric information, a biometric public key generating unit that generates a pair of a secret key and a public key based on a predetermined digital signature algorithm, generates an expansion key by expanding the secret key using random data, and generates registration commitment information from the expansion key and the registration feature data, and a biometric certificate generating unit that generates the biometric certificate including the registration commitment information and the public key, the signature generation terminal includes a message input unit that receives the message, a sensor that acquires the biometric information of the user, a feature data extracting unit that extracts the digital signature feature data from the biometric information, and a biometric digital signature generating unit that generates a pair of one-time secret key and one-time public key based on a predetermined digital signature algorithm, generates a digital signature for the message based on the predetermined digital signature algorithm using the one-time secret key, generates a one-time expansion key by expanding the one-time secret key using random data, generates digital signature commitment information from the one-time expansion key and the digital signature feature data, and generates a biometric digital signature including the one-time public key, the digital signature, and digital signature commitment, the signature verification device includes an input unit that receives the message and the biometric digital signature, a biometric digital signature verifying unit that verifies whether or not the digital signature included in the biometric digital signature is a right digital signature for the message using the one-time public key included in the biometric digital signature and the predetermined digital signature algorithm, calculates a differential expansion key by calculating a difference between the registration commitment information and the digital signature commitment information and performing an error correction process, compresses the differential expansion key to calculate a differential secret key, and verifies that the differential secret key, the public key, and the one-time public key satisfy a predetermined relation, and when all of the verifying is successfully performed, a final determination result indicates success.

The above problem is also solved by a signature verification method in a biometric signature system including a registration terminal that generates a biometric certificate based on registration feature data of biometric information of a registration user, a signature generation terminal that generates a digital signature for a predetermined message based on digital signature feature data of biometric information of a digital signature generation user, and a signature verification device that verifies the digital signature based on the biometric certificate, and the signature verification method includes a step of acquiring, by the registration terminal, biometric information of a user, a step of extracting, by the registration terminal, the registration feature data from the biometric information, a step of generating, by the registration terminal, a pair of a secret key and a public key based on a predetermined digital signature algorithm, a step of generating, by the registration terminal, an expansion key by expanding the secret key using random data, a step of generating, by the registration terminal, registration commitment information from the expansion key and the registration feature data, a step of generating, by the registration terminal, the biometric certificate including the registration commitment information and the public key, a step of receiving, by the signature generation terminal, the message, a step of acquiring, by the signature generation terminal, the biometric information of the user, a step of extracting, by the signature generation terminal, the digital signature feature data from the biometric information, a step of generating, by the signature generation terminal, a pair of one-time secret key and one-time public key based on a predetermined digital signature algorithm, a step of generating, by the signature generation terminal, a digital signature for the message based on the predetermined digital signature algorithm using the one-time secret key, a step of generating, by the signature generation terminal, a one-time expansion key by expanding the one-time secret key using random data, a step of generating, by the signature generation terminal, digital signature commitment information from the one-time expansion key and the digital signature feature data, a step of generating, by the signature generation terminal, a biometric digital signature including the one-time public key, the digital signature, and digital signature commitment, a step of receiving, by the signature verification device, the message and the biometric digital signature, a step of verifying, by the signature verification device, whether or not the digital signature included in the biometric digital signature is a right digital signature for the message using the one-time public key included in the biometric digital signature and the predetermined digital signature algorithm, a step of calculating, by the signature verification device, a differential expansion key by calculating a difference between the registration commitment information and the digital signature commitment information and performing an error correction process, a step of compressing, by the signature verification device, the differential expansion key to calculate a differential secret key, and a step of verifying, by the signature verification device, that the differential secret key, the public key, and the one-time public key satisfy a predetermined relation, wherein when all of the verifying is successfully performed, a final determination result indicates success.

Effects of the Invention

According to the present invention, the digital signature system (the biometric signature system) having high convenience in which the user need not carry belongings or remember confidential information, and can generate a digital signature for an arbitrary electronic document using his/her biometric information using an arbitrary terminal can be implemented. Further, it is possible to construct the digital signature system in which it is unnecessary to store the confidential information such as the secret key or the template, the security is secured, and the operation management cost is low. Moreover, it is unnecessary to register user dependent information or the like in the terminal in advance, and it is unnecessary to be connected to the network at the time of signing, and thus the digital signature system can be used for a wide range of uses without limiting an application.

BRIEF DESCRIPTION OF THE DRAWINGS

FIG. 4 is a flowchart illustrating a digital signature generation process.

MODE FOR CARRYING OUT THE INVENTION

Hereinafter, an embodiment of the present invention will be described in detail using an example with reference to the appended drawings. A description will proceed with a biometric signature system in which at the time of registration, data (hereinafter, a biometric certificate) for verifying a digital signature is generated based on the biometric information of the user and registered in a public DB (repository), and at the time of digital signature generation, a signature generation terminal generates a digital signature (hereinafter, biometric digital signature) for an arbitrary message based on only the biometric information of the user, and a signature verification device verifies the biometric digital signature using the biometric certificate. The biometric signature system can be used for electronic application in an electronic government, user authentication via a network, and the like.

Figure 1:
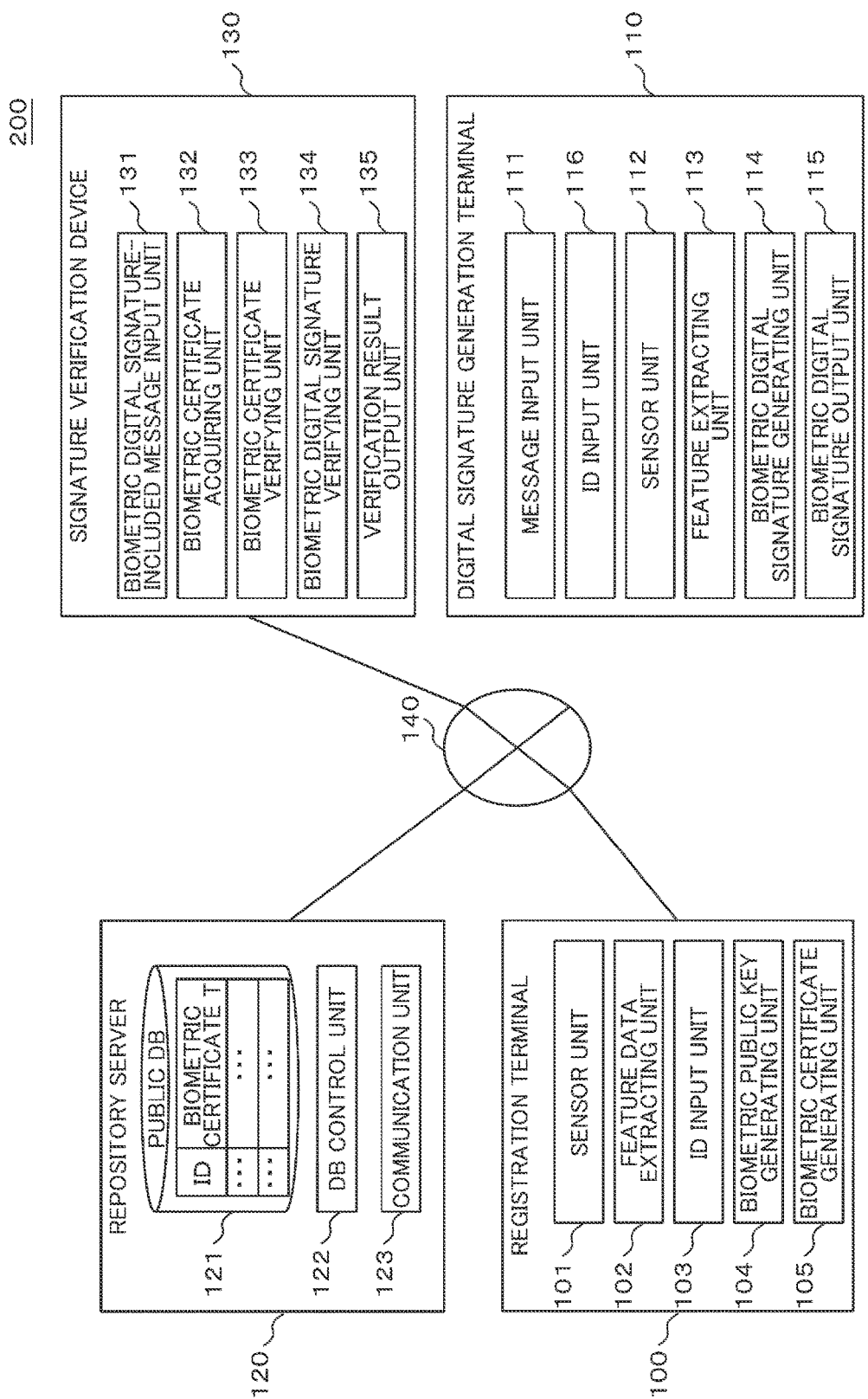
FIG. 1 is a block diagram of a biometric signature system.

A system configuration of the biometric signature system will be described with reference to FIG. 1. Referring to FIG. 1, a biometric signature system 200 includes a registration terminal 100, a repository server 120, a digital signature generation terminal 110, a signature verification device 130, and a network 140.

The registration terminal 100 issues a biometric certificate of the user. The repository server 120 manages the biometric certificate and opens the biometric certificate to the public. The digital signature generation terminal 110 generates a biometric digital signature for a message (an electronic document) using the biometric information of the user. The signature verification device 130 verifies the biometric digital signature.

The registration terminal 100 includes a sensor (sensor unit) 101, a feature data extracting unit 102, an ID input unit 103, a biometric public key generating unit 104, and a biometric certificate generating unit 105.

The sensor 101 acquires registration biometric information such as a fingerprint or a vein from the user. The feature data extracting unit 102 extracts registration feature data from the registration biometric information. The ID input unit 103 receives an input of a user ID. The biometric public key generating unit 104 generates a biometric public key from the registration feature data. The biometric certificate generating unit 105 generates a biometric certificate by allocating a digital signature of the registration terminal to the user ID and the biometric public key.

The repository server 120 includes a public database (DB) 121, a DB control unit 122, and a communication unit 123. The public DB 121 registers the biometric certificate.

The digital signature generation terminal 110 includes a message input unit 111, an ID input unit 116, a sensor (sensor unit) 112, a feature data extracting unit 113, a biometric digital signature generating unit 114, and a biometric digital signature output unit 115.

The message input unit 111 receives a message serving as a digital signature generation target. The ID input unit 116 receives an ID of the user. The sensor 112 acquires digital signature biometric information from the user. The feature data extracting unit 113 extracts digital signature feature data from the digital signature biometric information. The biometric digital signature generating unit 114 generates a biometric digital signature for a message using the digital signature feature data. The biometric digital signature output unit 115 outputs the biometric digital signature.

The signature verification device 130 includes a biometric digital signature-included message input unit 131, a biometric certificate acquiring unit 132, a biometric certificate verifying unit 133, a biometric digital signature verifying unit 134, and a verification result output unit 135.

The biometric digital signature-included message input unit 131 receives a set of a message and a biometric digital signature. The biometric certificate acquiring unit 132 acquires the biometric certificate for the user ID from the repository server 120. The biometric certificate verifying unit 133 verifies the integrity of the biometric certificate. The biometric digital signature verifying unit 134 verifies the biometric digital signature using the biometric certificate. The verification result output unit 135 outputs the verification result.

The registration terminal 100, the repository server 120, and the signature verification device 130 are connected via the network 140. However, the digital signature generation terminal 110 need not be necessarily connected to the network. The signature verification device 130 may include a DB and store the biometric certificate. In this case, the signature verification device 130 need not acquire the biometric certificate from the repository server. At this time, the signature verification device 130 need not be necessarily connected to the network at the time of digital signature verification.

Figure 2:
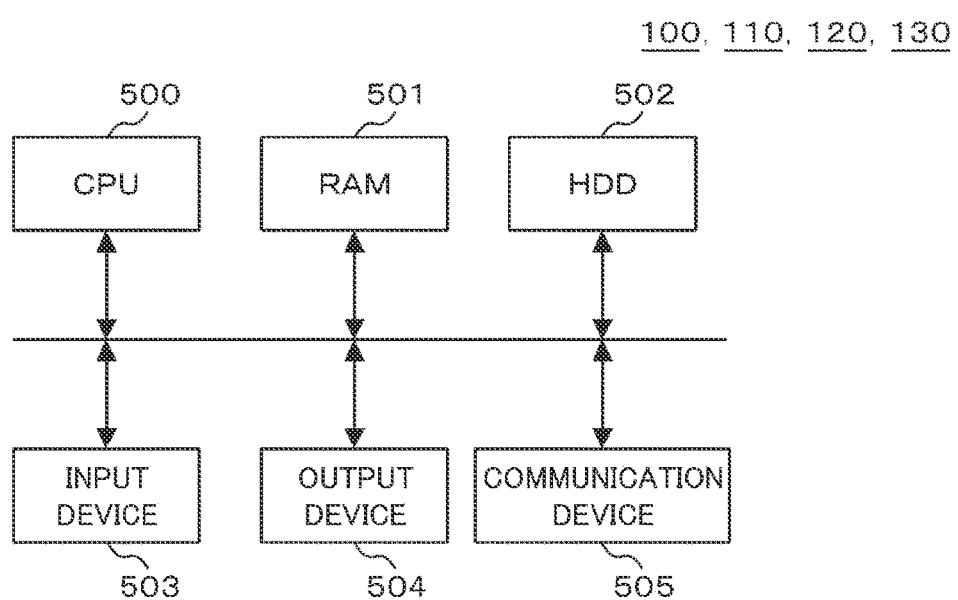
FIG. 2 is a block diagram for describing hardware configuration of a registration terminal, a signature generation terminal, a repository server, and a signature verification device.

Hardware configurations of the registration terminal 100, the digital signature generation terminal 110, the repository server 120, and the signature verification device 130 will be described with reference to FIG. 2. Referring to FIG. 2, each of the registration terminal 100, the digital signature generation terminal 110, the repository server 120, and the signature verification device 130 includes a CPU 500, a RAM 501, a HDD 502, an input device 503, an output device 504, and a communication device 505.

Figure 3:
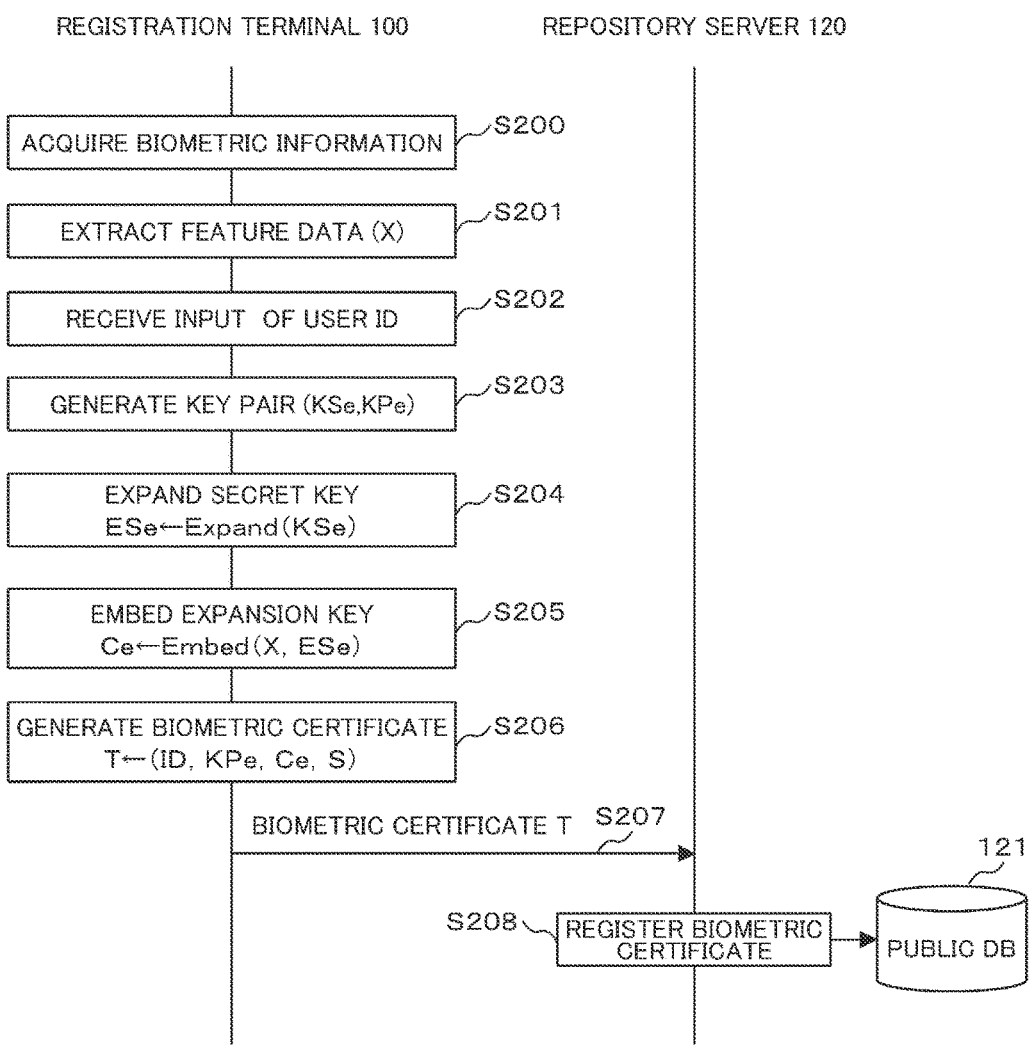
FIG. 3 is a flowchart illustrating a registration process.

A registration process flow of the biometric signature system will be described with reference to FIG. 3. Referring to FIG. 3, the registration terminal 100 acquires registration biometric information (a fingerprint image, a vein image, or the like) of a registration user through the sensor unit 101 (S200). The feature data extracting unit 102 extracts registration feature data X from the registration biometric information (S201). The ID input unit 103 receives an input of an ID of the registration user (S202), and the biometric public key generating unit 104 randomly generates a pair of a secret key KSe and public key KPe in a predetermined digital signature algorithm (for example, a Waters digital signature) (S203). The biometric public key generating unit 104 generates an expansion key ESe by expanding the secret key KSe using a predetermined key expansion function Expand using random data (S204). The biometric public key generating unit 104 generates a registration commitment Ce=Embed(X,ESe) by embedding the expansion key ESe in the registration feature data X using a predetermined embedding function Embed (S205). At this time, the embedding is performed so that it is sufficiently difficult to estimate the registration feature data X and/or the secret key KSe from the registration commitment Ce. Instead of directly embedding the secret key KSe, by expanding the secret key KSe using random data, increasing outward entropy, and then embedding the secret key KSe (keeping the biometric information secret), it is possible to secure security even when the distribution of the registration feature data X is biased. A specific example of the embedding function Embed will be described later. A set of (KPe,Ce) is referred to as a "biometric public key."

the biometric certificate generating unit 105 generates a digital signature S using the secret key held in the registration terminal 100 for the set of the user ID and the biometric public key (KPe,Ce), and uses a set T=(ID,KPe,Ce,S) of the data as the biometric certificate (S206). The biometric certificate generating unit 105 transmits the biometric certificate to the repository server 120 (S206). Here, a second digital signature algorithm of generating the digital signature S may be different the predetermined digital signature algorithm, and a common digital signature such as the RSA, the DSA, or the Schnorr digital signature may be used.

The repository server 120 registers the biometric certificate T in the public DB 121 (S207).

Since it is difficult to estimate the feature data X and the secret key KSe from the biometric public key as described above, although the biometric certificate T is opened to the public, a risk in which the biometric information or the digital signature will be forged is sufficiently low, and the security can be secured. Further, as the biometric certificate T is opened to the public, it is possible to verify an arbitrary biometric digital signature through an arbitrary signature verification device. According to the present embodiment, since confidential information such as a secret key or a template is held nowhere, it is possible to construct the digital signature system in which the security is high, and an operation management cost is low.

A digital signature generation flow of the biometric signature system will be described with reference to FIG. 4. Referring to FIG. 4, the digital signature generation terminal 110 receives an input of an arbitrary message M through the message input unit 111 (S300).

The ID input unit 116 receives an input of the user ID (S301). Further, step 301 may be omitted, and a sign such as NULL may be used as the user ID. In this case, at the time of signing, the user need not input an ID, and thus convenience is expected to be further improved.

The sensor unit 112 acquires the digital signature biometric information of the user (S302). The feature data extracting unit 113 extracts digital signature feature data X' from the digital signature biometric information (S303). The biometric digital signature generating unit 114 randomly generates a pair of a secret key and a public key in a predetermined digital signature algorithm (specifically, the Schnorr digital signature) (S304). Hereinafter, the secret key is referred to as a "one-time secret key KSs," and the public key is referred to as a "one-time public key KPs."

The biometric digital signature generating unit 114 generates a one-time expansion key ESs for the one-time secret key KSs using the key expansion function Expand (S305). The biometric digital signature generating unit 114 generates a digital signature commitment Cs=Embed (X',ESs) by embedding the one-time expansion key ESs in the digital signature feature data X' using the embedding function Embed (S306). Instead of directly embedding the one-time secret key KSs, by expanding the one-time secret key KSs using random data, increasing outward entropy, and then embedding the one-time secret key KSs (keeping the biometric information secret), it is possible to secure the security even when the distribution of the digital signature feature data X' is biased.

The biometric digital signature generating unit 114 generates a digital signature σ' for the message M using the one-time public key KPs and a predetermined digital signature algorithm (S307). The biometric digital signature output unit 115 outputs a set σ=(ID, KPs, Cs, σ') of the user ID, the one-time public key KPs, the digital signature commitment Cs, and the digital signature σ' as the biometric digital signature (S308).

Since it is sufficiently difficult to estimate the digital signature feature data X' and the one-time secret key KSs from the digital signature commitment Cs due to characteristics of the embedding function Embed, a risk in which the biometric information or other biometric digital signatures will be forged from the biometric digital signature is sufficiently low, and the security can be secured. Further, when the biometric digital signature is generated, information (specifically, the helper data) relying on the user other than the message M serving as the digital signature target, the user ID, and the biometric information serving as the secret key is not used at all. Thus, it is unnecessary to store any user dependent information in the digital signature generation terminal 110, and it is also unnecessary to transmit an inquiry to a server or the like and acquire the user dependent information. Thus, the user can generate the digital signature using an arbitrary digital signature generation terminal 110. Further, the digital signature generation terminal 110 need not be necessarily connected to the network 140 and may be used in a stand-along form.

Figure 5:
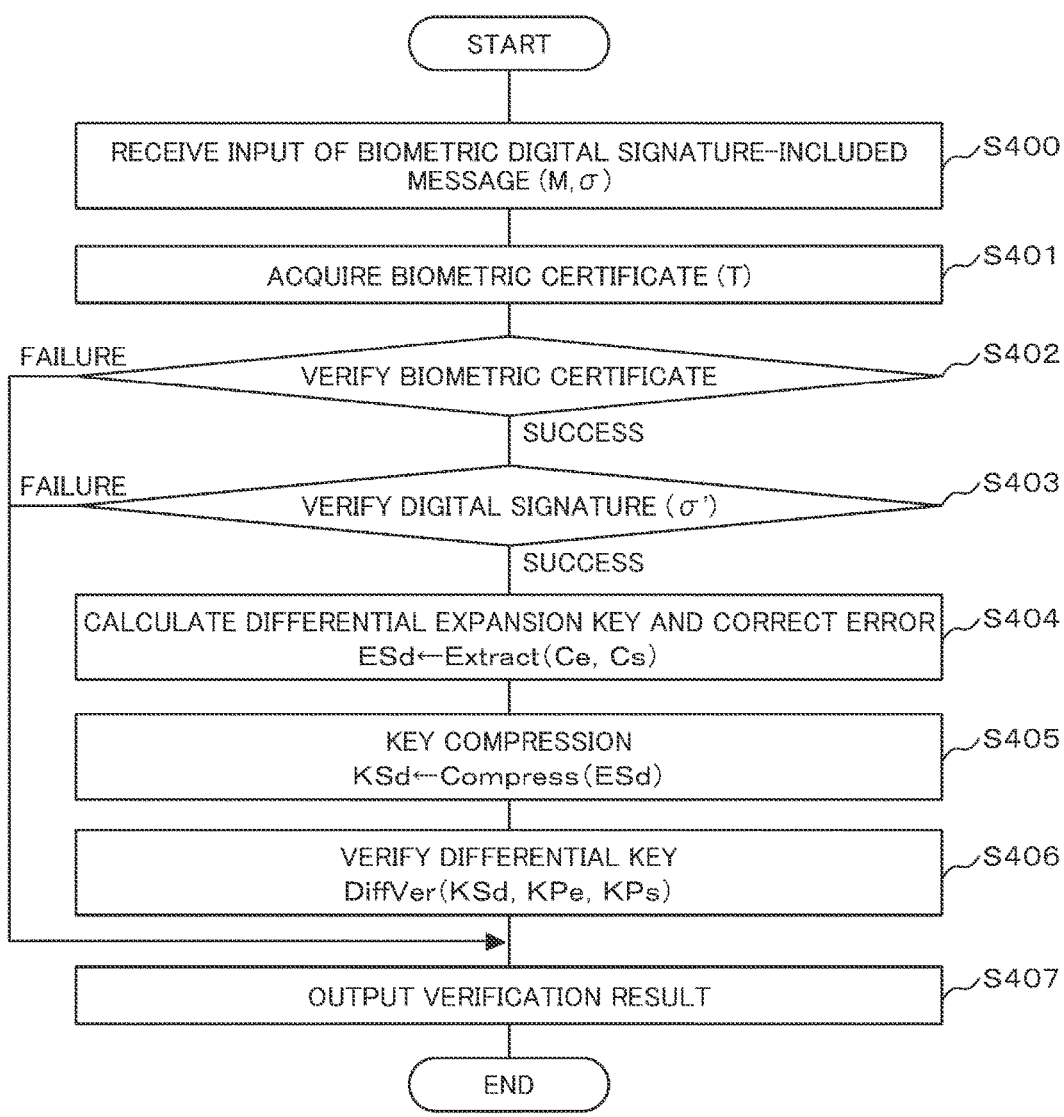
FIG. 5 is a flowchart illustrating a digital signature verification process.

A digital signature verification flow of the biometric signature system will be described with reference to FIG. 5. Referring to FIG. 5, the signature verification device 130 receives an input of the message M and the biometric digital signature σ=(ID, KPs, Cs, σ') (S400). The biometric certificate acquiring unit 132 transmits the ID included in the biometric digital signature a to the repository server 120, and acquires the biometric certificate T=(ID, KPe, Ce, S) corresponding to the ID (S401). The biometric certificate verifying unit 133 verifies that the biometric certificate T is not falsified using the digital signature S included in the biometric certificate T and the public key of the registration terminal 100 (S402). The second digital signature algorithm is used for the verification. When the verification succeeds, the biometric certificate verifying unit 133 transitions to step 403. When the verification fails in step 402, the biometric certificate verifying unit 133 determines "failure" as a final verification result, and jumps to step 407.

The biometric digital signature verifying unit 134 verifies the digital signature σ' included in the biometric digital signature σ using the one-time public key KPs included in the biometric digital signature σ (S403). When the verification succeeds, the biometric digital signature verifying unit 134 transitions to step 404. When the verification fails in step 403, the biometric digital signature verifying unit 134 determines "failure" as a final verification result, and jumps to step 407.

The biometric digital signature verifying unit 134 calculates a differential expansion key ESd=Extract(Cs, Ce) using a predetermined function Extract based on the registration commitment Ce included in the biometric certificate T and the digital signature commitment Cs included in the biometric digital signature σ (S404). At this time, when the registration feature data X is sufficiently close (similar) to the digital signature feature data X', the predetermined function Extract is configured using the error correction process so that the differential expansion key ESd is identical to a predetermined operation result corresponding to a "difference" between the expansion key ESe and the one-time expansion key ESs (ESd=ESe−ESs). A specific example of the function Extract will be described later.

The biometric digital signature verifying unit 134 compresses the differential expansion key using a predetermined key compression function Compress, and generates a differential secret key KSd (S405). Here, when ESd=ESe−ESs is held, the function Compress is configured so that KSd=KSe−KSs is held. A specific example of the function Compress will be described later. In the technique disclosed in Non Patent Literature 2, ESd is directly used in a subsequent process, but when the distribution of the feature data of the biometric information is biased, an attacker that has observed ESd can narrow down a candidate of the secret key based on ESd in view of in the bias in the biometric information, and thus the security is lowered. On the other hand, in the present embodiment, since ESd is compressed, there is no bias, and thus, the security can be secured. Since ESe and ESs are data obtained by expanding the secret keys KSe and KSs using random data and increasing the outward entropy, although ESe and ESs are compressed, the security of the original secret key is not damaged.

The biometric digital signature verifying unit 134 verifies whether or not the public key KPe included in the biometric certificate T, the one-time public key KPs included in the biometric digital signature σ, and the differential secret key KSd satisfy a relation described below using a predetermined function DiffVer. In other words, it is verified whether or not a "difference" between the secret key KSe corresponding to the public key KPe and the one-time secret key KSs corresponding to the one-time public key KPs is identical to the differential secret key KSd (S406). DiffVer is assumed to return "success" when the relation is satisfied and return "failure" otherwise. The details of the function DiffVer will be described later. The verification result output unit 135 outputs the final verification result (S407).

According to the present embodiment, when the digital signature generation user and the registration user are the same person, the registration feature data X is expected to is sufficiently close (similar) to the digital signature feature data X'. At this time, the differential secret key KSd is identical to the "difference" between the secret key KSe and the one-time secret key KSs (KSd=KSe−KSs), and thus the differential key verification succeeds.

On the contrary, when the digital signature generation user and the registration user are different persons, the registration feature data X is expected not to be close (similar) to the digital signature feature data X'. At this time, the differential secret key KSd is not identical to the "difference" between the secret key KSe and the one-time secret key KSs (KSd≠KSe−KSs), and thus the differential key verification fails.

Due to the above-described features, the biometric signature system 200 of the present embodiment can generate the right biometric digital signature (that can be successfully verified) only when the digital signature user and the registration user are the same person but hardly generates the biometric digital signature otherwise.

Further, according to the present embodiment, the signature verification device can calculate the differential secret key KSd=KSe−KSs (if the user is the same person), but it is difficult to specify the secret key KSe and/or the one-time secret key KSs from the differential secret key KSd=KSe−KSs, and thus it is difficult to forge the digital signature and recover the registration feature data X and/or the digital signature feature data X'.

In the present embodiment, the secret key is expanded using random data and embedded in the biometric information after increasing the outward entropy, and thus even when the biometric information distribution is biased, partial information leak of the secret key from the commitment is prevented. Further, at the time of digital signature verification, the error correction process is performed on the commitment difference to calculate the differential expansion key, and then the compression process is performed. Thus, it is possible to generate the non-biased differential secret key that does not depend on the biometric information distribution and perform the key verification process based on the differential secret key. Accordingly, an attack of narrowing down a candidate of the secret key, by an attacker is prevented, and the secure biometric signature system is implemented even when the biometric information distribution is biased.

Specific configurations of the predetermined functions Expand, Embed, Extract, Compress, and DiffVer will be described below. In the description of the specification, characters used in mathematical formulas are not allowed to be used, and thus similar characters are used. The registration feature data and the digital signature feature data, that is, $$x=(x_1, \ldots, x_N), x'=(x'_1, \ldots, x'_N) \qquad \text{[Math 1]}$$

are indicated by N=n×m-dimensional real vectors, and a distance therebetween is indicated by an L∞distance.

$$d(X,X')=\max_i |x_i - x'_i| \qquad \text{[Math 2]}$$

is taken. If the distance is a predetermined threshold value t or less (d(X,X')≤t), both of the feature data are regarded to be identical (the same living body). Further, a vector including n integers, that is, $$w=(w_1, \ldots, w_n) \qquad \text{[Math 3]}$$

is decided so that $$w_i \approx \tfrac{1}{2} t (i=1, \ldots, n) \qquad \text{[Math 4]}$$

is held, and all pairs $(w_i, w_j)$ are mutually prime, and $$W = w_1 \times \ldots \times w_n \qquad \text{[Math 5]}$$

is taken. Further, for a vector, that is, $$v=(v_1, \ldots, v_n) \qquad \text{[Math 6]}$$

a modulo operation of the vector is defined as follows:

$$v \bmod w = (v_1 \bmod w_1, \ldots, v_n \bmod w_n) \qquad \text{[Math 7]}$$

Here, the following simultaneous congruences having an integer V as a variable is considered.

$$V \bmod w_1 = v_1,$$
$$\ldots,$$
$$V \bmod w_n = v_n \qquad \text{[Math 8]}$$

One having W as a divisor is decided as a solution V of this equation through the Chinese remainder theorem. Thus, a function of mapping the vector $w=(w_1, \ldots, w_n)$ to the integer V is defined as follows:

$$f: Z^n \to Z \qquad \text{[Math 9]}$$

At this time, the following equation is held:

$$f(v_1 + v_2 \bmod w) = f(v_1) + f(v_2) \bmod W \qquad \text{[Math 10]}$$

Further, functions φ and φ are defined as follows:

$$\phi: R^N \to R^N, \phi(x) = (w_1 x_1, \ldots, w_n x_n, w_1 x_{n+1}, \ldots, w_n x_{2n}, \ldots, w_1 x_{(m-1)n+1}, \ldots, w_m x_n)$$

$$\varphi: R^N \to Z^N, \varphi(y) = (\lfloor y_1 + 0.5 \rfloor, \ldots, \lfloor y_N + 0.5 \rfloor) \qquad \text{[Math 11]}$$

At this time, when feature data x and x' satisfy d(x,x')<t, d(φ(x),φ(x'))<½ is held, and $$\varphi(\phi(x) - \phi(x')) = 0 \qquad \text{[Math 12]}$$

is held at an overwhelming probability.

Meanwhile, a modified Waters signature (MWS) obtained by modifying the Waters signature as follows is considered. The details of the Waters signature are disclosed in Non Patent Literature 3.

A cyclic group G of a prime order p used in the Waters digital signature is selected so that W is divided by p−1 without a remainder. Further, for a generation source g of G, in the Waters digital signature, α that is random and satisfies $$\alpha \in Z_p^x \qquad \text{[Math 13]}$$

is used as the secret key, and $$g_1 = g^\alpha \in G \qquad \text{[Math 14]}$$

is used as the public key, but in the MWS, β that is random and satisfies $$\beta \in Z_W \qquad \text{[Math 15]}$$

is used as the secret key KS, and $$\alpha = h^\beta \in Z_p^x, g_1 = g^\alpha \in Z_W \qquad \text{[Math 16]}$$

is calculated, and $g_1$ is used as the public key KP. Here, h, that is, $$h \in Z_p^x \quad \text{[Math 17]}$$

also serves as a source of the order W.

The security of the MWS can come to the security of the Waters digital signature. In other words, the MWS can be guaranteed to the same security as in the Waters digital signature.

Further, m integers r1, ..., rm are randomly selected, and r=(r1, ..., rm) is taken.

All or some of (G, p, g, h, w, r) may be parameters decided at the time of system setup or may be parameters decided for each user at the time of user registration.

Under the above preparation, a function $$\text{Expand}: Z \to Z^N, ES = \text{Expand}(KS) \quad \text{[Math 18]}$$

is configured as follows. First, for an input integer KS,

[Math 19]

$$s^{(n)} = f^{-1}(KS) \in Z^n \quad \text{(Formula 1)}$$

is calculated. Then, m n-dimensional integer vectors $$s_1^{(n)}, \ldots, s_m^{(n)} \in Z^n \quad \text{[Math 20]}$$

are randomly generated using random data so that

[Math 21]

$$s^{(n)} = r_1 s_1^{(n)} + \ldots + r_m s_m^{(n)} \bmod w \quad \text{(Formula 2)}$$

is satisfied, and an N=n×m-dimensional vector obtained by connecting the m n-dimensional integer vectors, that is, $$ES = (s_1^{(n)}, \ldots, s_m^{(n)}) \in Z^N \quad \text{[Math 22]}$$

is output. Here, it should be careful that

[Math 23]

$$KS = f(s^{(n)}) = f(r_1 s_1^{(n)} + \ldots + r_m s_m^{(n)} \bmod w) \quad \text{(Formula 3)}$$

is held from Formulas 1 and 2. This takes the same form as the function Compress (Formula 4) which will be described later. In other words, it should be careful that the function Expand and the function Compress are inverse functions. Here, for one KS, there are a plurality of (the (m−1)-th power of W) ESs satisfying (Formula 3). As the function Expand, one is randomly selected from the candidates and output. The random data may be generated using a pseudo random number generator or the like. The entropy of output information ESe increases to be m times as large as the entropy of input information KSs.

The function Embed is defined as follows:

$$C = \text{Embed}(x, ES) = \phi(x) + ES \bmod W \quad \text{[Math 24]}$$

Here, W indicates an N=n×m-dimensional vector in which m ws are lined up.

Since the information of the feature data x is masked by the expansion key ESe, even when the distribution of the feature data x is biased, it is possible to prevent leak of information of the feature data x or the secret key KSe from the registration commitment information Ce.

The function Extract is defined as follows:

$$ESd = \text{Extract}(Ce, Cs) = \varphi(Ce - Cs \bmod W) \quad \text{[Math 25]}$$

At this time, it should be careful that $$\begin{aligned} ESd &= \varphi(ESe - ESs + \phi(x) - \phi(x') \bmod W) \quad \text{[Math 26]} \\ &= ESe - ESs + \varphi(\phi(x) - \phi(x') \bmod W) \bmod W \\ &= ESe - ESs + \varphi(\phi(x - x') \bmod W) \bmod W \\ &= ESe - ESs \bmod W \end{aligned}$$

is held when the feature data is sufficiently close to each other (d(x,x')<t) from the definition of φ.

m vectors obtained by delimiting the N=m×n-dimensional vector ESd output from the function Extract from the head in units of n dimensions are defined as $$u_1^{(n)}, \ldots, u_m^{(n)} \in Z^n \quad \text{[Math 27]}$$

The function Compress is defined as follows:

[Math 28]

$$KSd = \text{Compress}(ESd) = f(r_1 u_1^{(n)} + \ldots + r_m u_m^{(n)} \bmod w) \quad \text{(Formula 4)}$$

It should be careful that due to this definition and linearity of f, the function Compress has linearity, and $$\begin{aligned} KSd &= \text{Compress}(ESe - ESs) \quad \text{[Math 29]} \\ &= \text{Compress}(ESe) - \text{Compress}(KSs) \bmod W \\ &= KSe - KSs \bmod W \end{aligned}$$

is held. Compress corresponds to an inverse function of Expand and is a process of compressing an information amount of a temporarily increased key up to an original size. When the distributions of the biometric feature data x and x' are biased, an attacker who has observed the commitments Ce and Cs can narrow down the expansion keys ESe and ESs from the relation of $$ESe = Ce - \phi(x) \bmod W$$

$$ESs = Cs - \phi(x') \bmod W \quad \text{[Math 30]}$$

In other words, the posterior distributions of ESe and ESs after x and x' are observed become non-uniform. Due to this reason, it is difficult to secure sufficient security in the method disclosed in Non Patent Literature 2. On the other hand, the difference in the expansion key is compressed by Compress, and thus the posterior distribution of the differential secret key after the compression becomes uniform, and thus the security can be secured.

Lastly, DiffVer is defined as follows: First, $$\alpha_d = h^{Ksd} \in Z_p^x \quad \text{[Math 31]}$$

is calculated, and "success" is output if $$KSe = KSs^{\alpha_d} \quad \text{[Math 32]}$$

is held in the group G, and otherwise, "failure" is output. From the configuration method of the MWS, when and only when $$KSd = KSe - KSs \bmod W \quad \text{[Math 33]}$$

is held, $$KSs^{\alpha_d} = (g^{h^{KSs}})^{h^{KSd}} = g^{h^{KSs+KSd}} = g^{h^{KSe}} \quad \text{[Math 34]}$$

is held, and "success" is output.

According to the above embodiment, the digital signature system (the biometric signature system) having high convenience in which the user need not carry belongings or remember confidential information, and can generate a digital signature for an arbitrary electronic document using only his/her biometric information using an arbitrary terminal can be implemented. Further, it is possible to construct the digital signature system in which it is unnecessary to store the confidential information such as the secret key or the template, the security is secured, and the operation management cost is low. Moreover, it is unnecessary to register user dependent information or the like in the terminal in advance, and it is unnecessary to be connected to the network at the time of signing, and thus the digital signature system can be used for a wide range of uses without limiting an application.

REFERENCE SIGNS LIST

100 Registration terminal
101 Sensor unit
102 Feature data extracting unit
103 ID input unit
104 Biometric public key generating unit
105 Biometric certificate generating unit
110 Digital signature generation terminal
111 Message input unit
112 Sensor unit
113 Feature data extracting unit
114 Biometric digital signature generating unit
115 Biometric digital signature output unit
116 ID input unit
120 Repository server
121 Public DB
122 DB control unit
123 Communication unit
130 Signature verification device
131 Biometric digital signature-included message input unit
132 Biometric certificate acquiring unit
133 Biometric certificate verifying unit
134 Biometric digital signature verifying unit
135 Verification result output unit
140 Network
200 Biometric signature system
500 CPU
501 RAM
502 HDD
503 Input device
504 Output device
505 Communication device

The invention claimed is:

1. A biometric signature system, comprising:
a registration terminal that generates a biometric certificate based on registration feature data of biometric information of a user;
a signature generation terminal that generates a digital signature for a predetermined message based on digital signature feature data of biometric information of the user; and
a signature verification device that verifies the digital signature based on the biometric certificate,
wherein the registration terminal includes:
a registration sensor that acquires biometric information of the user, and
a registration processor communicatively coupled to the sensor, wherein the registration processor:
extracts a registration feature data from the biometric information to form a registration feature vector,
selects one from among a plurality of higher-dimensional vectors satisfying a predetermined relation on a secret key vector by performing first conversion on the secret key as an expansion key vector, and
generates registration commitment information by adding or subtracting the expansion key vector to or from the registration feature vector,
generates a pair of a secret key and a public key based on a first predetermined digital signature algorithm,
generates an expansion key by expanding the secret key using random data, and generates registration commitment information from the expansion key and the registration vector, and
generates the biometric certificate including the registration commitment information and the public key;
the signature generation terminal includes:
a message input that receives input of a message,
a generation sensor that acquires biometric information of the user, and
a generation processor that is communicatively coupled to the message input and the generation sensor, wherein the generation processor:
extracts the digital signature feature data from the biometric information to form a digital signature feature vector,
randomly selects one from among a plurality of higher-dimensional vectors satisfying a predetermined relation on a secret key vector by performing first conversion on the secret key as an expansion key vector,
generates the registration commitment information by adding or subtracting the expansion key vector to or from the registration feature vector,
generates a pair of one-time secret key and one-time public key based on a second predetermined digital signature algorithm,
selects one from among a plurality of higher-dimensional vectors satisfying a predetermined relation on one-time secret key vector by Performing the first conversion on the one-time secret key as a one-time expansion key vector,
generates digital signature commitment information by adding or subtracting the one-time expansion key vector to or from the digital signature feature vector,
generates the digital signature for the message based on the second predetermined digital signature algorithm using the one-time secret key,
generates a one-time expansion key by expanding the one-time secret key using random data, generates digital signature commitment information from the one-time expansion key and the digital signature feature data, and
generates the biometric digital signature including the one-time public key, the digital signature, and digital signature commitment;
the signature verification device includes:
a verification input that receives input of the message and the biometric digital signature, and
a verification processor communicatively coupled to the verification input, wherein the verification processor:
verifies whether or not the digital signature included in the biometric digital signature is a right digital signature for the message using the one-time public key included in the biometric digital signature and the predetermined digital signature algorithm,
calculates a differential expansion key by calculating a difference between the registration commitment information and the digital signature commitment information and performing an error correction process, generates a differential expansion key vector by performing a second operation on the registration commitment information and the digital signature commitment information, calculates a differential secret key vector serving as a difference between the secret key vector and the one-time secret key vector by performing predetermined-dimensional compression conversion on the differential expansion key vector, calculates a differential secret key by performing inverse conversion of the first conversion on the differential secret key vector, compresses the differential expansion key to calculate a differential secret key, and verifies that the differential secret key, the public key, and the one-time public key satisfy a predetermined relation, verifies that the public key, the one-time public key, and the differential secret key satisfies a predetermined relation, and when all of the verifying is successfully performed, a final determination result indicates success.

2. The biometric signature system according to claim 1, wherein the generation processor further:

generates digital signature for a set including the registration commitment information, the public key, and ID information of the user using a predetermined secret key held in the registration terminal and a predetermined second digital signature algorithm, and generates biometric certificate including a set of the registration commitment information, the public key, ID information of the user, and the digital signature, and wherein the verification processor further:

verifies an integrity of the biometric certificate using the digital signature, a public key of the registration terminal, and the second digital signature algorithm.

3. The biometric signature system according to claim 1, wherein the biometric signature system includes a repository server that holds the biometric certificate and opens the biometric certificate to the public, wherein the registration processor further: registers the biometric certificate in the repository server after generating the biometric certificate, and wherein the verification processor further acquires the biometric certificate from the repository server.

4. The biometric signature system according to claim 1, wherein the adding or the subtracting between the vectors is a remainder addition or a remainder subtraction having a predetermined integer as a divisor for each component of the vector.

* * * * *